United States Patent Office 3,469,988
Patented Sept. 30, 1969

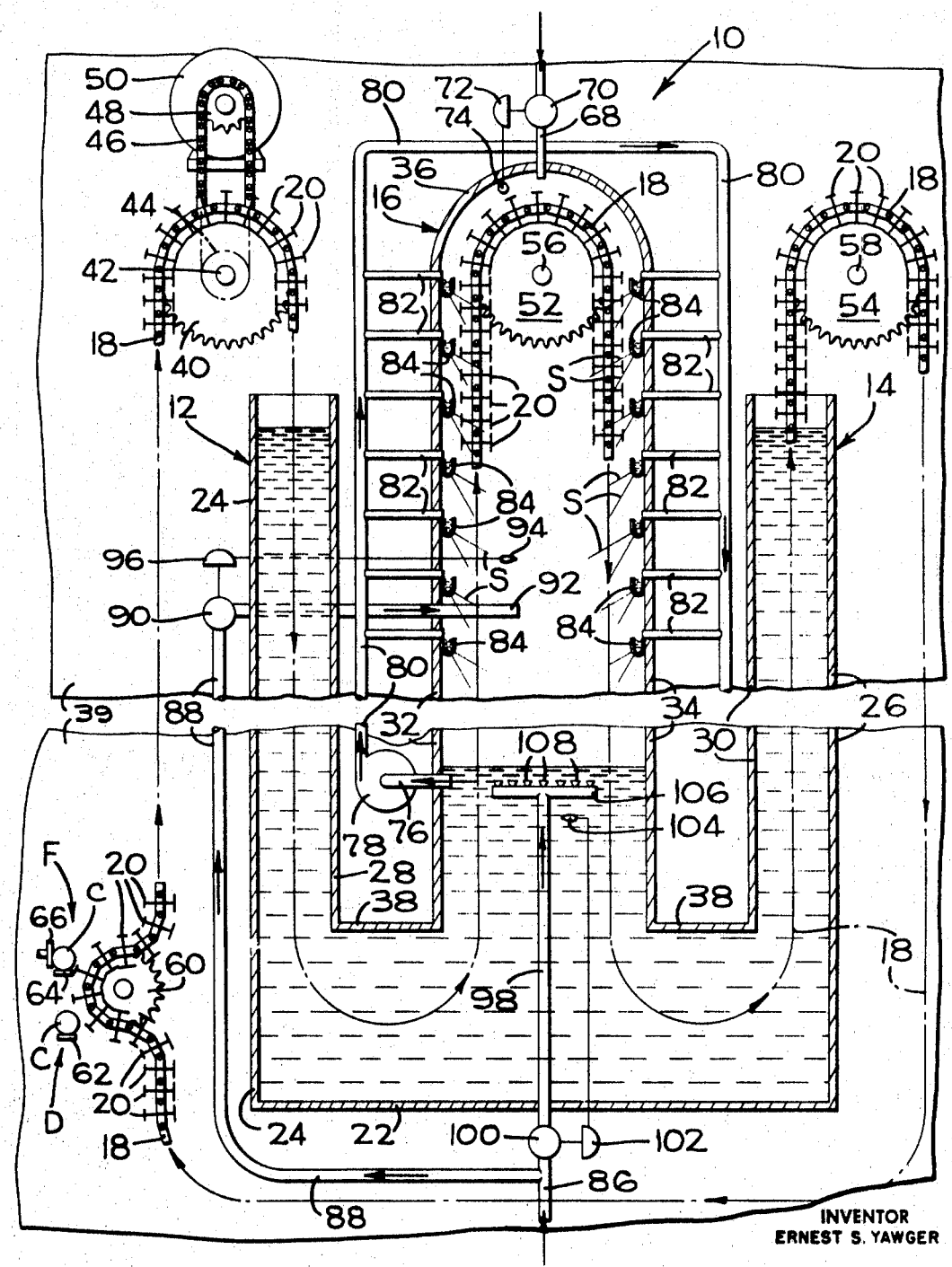
FIG_1

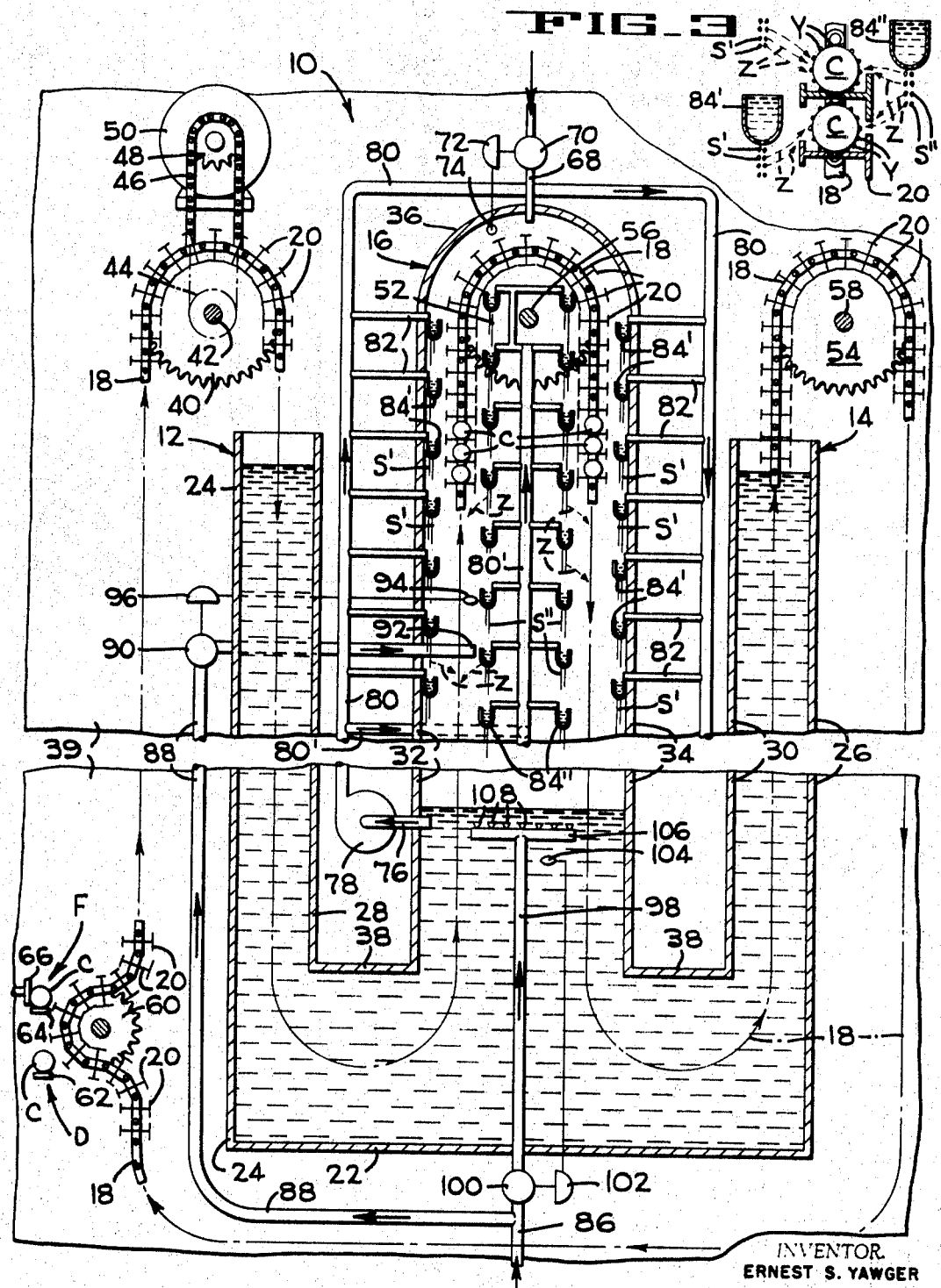

3,469,988
CONTINUOUS PROCESS FOR COOKING FOOD CONTAINED IN HERMETICALLY SEALED GLASS CONTAINERS
Ernest S. Yawger, San Jose, Calif., assignor to FMC Corporation, San Jose, Calif., a corporation of Delaware
Continuation-in-part of application Ser. No. 528,940, Feb. 21, 1966. This application June 21, 1967, Ser. No. 647,706
Int. Cl. H23l *3/02, 1/00;* B65b *55/18*
U.S. Cl. 99—1                                    5 Claims

ABSTRACT OF THE DISCLOSURE

A hydrostatic cooker having a cooking chamber filled with a steam-air mixture maintained at the sterilizing temperature and at a pressure sufficient to prevent rupture of hermetically sealed containers due to cooking pressure increase within the containers passing through the cooking chamber. Streams of sprays of cascading water at/or slightly above the cooking temperature in the cooking chamber is either directed onto the containers for heating the same by liquid contact, or is directed adjacent to but not against the containers for maintaining the steam-air mixture adjacent the containers at the cooking temperature and for circulating the mixture assuring that vapor condensed upon contact with the containers during heating is immediately replaced by hot vapor evaporated from the cascading water thereby preventing a zone of heat insulating air from surrounding the containers.

CROSS REFERENCE TO RELATED APPLICATION

This application is a continuation-in-part of the pending application of Ernest S. Yawger Ser. No. 528,940 filed Feb. 21, 1966, and entitled Hydrostatic Cooker, now abandoned.

BACKGROUND OF THE INVENTION

This invention relates to hydrostatic cookers and more particularly to a hydrostatic cooker which is arranged to cook food packed in containers such as wide mouthed glass jars.

Glass containers of the wide mouthed variety are presently sterilized by the batch process in a retort. The sterilization temperature must be sufficiently high to kill the bacteria and the elapsed time must be as short as possible in order to retain vitamins, color, and other desirable properties of the food. In addition a short cooking time retains the fresh appearance of food.

During the cooking cycle the internal pressure of the containers rises due to the liberation of non-condensible gases and thermal expansion of the product. This pressure exerts the force which is great enough to displace the lids and thereby destroy the seal whether the lid be of the vacuum vapor or the twist-off type. To overcome this problem of internal pressures, the retort is usually partially filled with a quantity of water in which the glass jars are immersed during the sterilization process. The head space remaining above the water level is supplied with a pressurized gaseous fluid regulated to a value which will subject the submerged glass containers to an external pressure which equals or exceeds the internal pressure in the glass jars.

Efforts to sterilize or cook food in wide mouthed glass jars by means of hydrostatic cookers have proved to be unsuccessful since the corresponding pressure of saturated steam at the desired cooking temperature is too low thereby rendering the internal pressure of the glass containers effective to dislodge the lid and break the seal. Hydrostatic cooking is however the preferred way of sterilizing packed foods since the process is continuous resulting in a production rate which is commercially more attractive. If saturated steam were to be supplied to the cooking chamber of the hydrostatic cooker at the desired cooking temperature and corresponding pressure, the pressure increase within the containers would exceed the pressure acting on the external surfaces of the containers and, accordingly, would displace the lids from the containers.

SUMMARY OF THE INVENTION

This invention is concerned with a method and apparatus which will enable a hydrostatic cooker to process wide mouthed glass jars. According to the method aspects of this invention the glass jars are passed through an inlet hydrostatic leg which gradually heats the container to approximately 200° F. They are then passed through a cooking chamber which is supplied with air at approximately 25–35 p.s.i.g. Cascading water is then supplied by a series of tandem troughs flooding the jars during their passage through the chamber. The cooking and sterilization is performed by this flood of water. From the cooking chamber the jars then pass through an exit hydrostatic leg which effects a gradual cooling of the jars.

Accordingly, a primary object of this invention is to adapt a hydrostatic cooker for processing of wide mouth jars.

Another object of this invention is to establish and maintain a desired amount of pressure in the cooking chamber of a hydrostatic cooker which will prevent the lids of wide mouth glass jars from breaking their seal.

Another object of this invention is to maintain the processing temperature constant while the glass containers are passing through the sterilizing chamber by cascading water or other suitable liquid at the processing temperature onto the containers.

Another object of this invention is to process wide mouth glass jars on a continuous basis with such jars being subjected respectively to a gradual heating phase, a cooking phase taking place under the influence of an external pressure which is sufficient to prevent the jars from leaking, and a gradual cooling phase.

In a modified form of the invention the cooking is done by a gaseous medium rather than by a liquid medium, which gaseous medium is in the form of a steam-air mixture within the cooking chamber and maintained at the cooking temperature. Streams of cascading water are directed downwardly adjacent the containers moving through the cooking chamber and serve to thoroughly mix or circulate the steam-air mixture and to immediately replenish vapor which condenses upon contact with the containers with hot vapor evaporated from the cascading water thereby preventing the formation of an insulating layer of air around the containers which would retard heat transfer.

BRIEF DESCRIPTION OF DRAWINGS

FIGURE 1 is a diagrammatic longitudinal sectional representation of a typical hydrostatic cooker which is adapted to process containers such as wide mouth jars when in the cooking chamber by cascading water directly onto the jars.

FIGURE 2 is a diagrammatic longitudinal sectional representation similar to FIGURE 1 but illustrating a second embodiment of the invention which is adapted to process containers when in the cooking chamber by vapors from a steam-air mixture.

FIGURE 3 is a diagrammatic representation illustrating the vapor cooking process of FIGURE 2, said view illustrating vapor from the steam-air mixture condensing on the containers, and the manner in which the condensed vapor is immediately replaced by vapor evaporating from hot water cascading therepast.

DESCRIPTION OF PREFERRED EMBODIMENTS

The hydrostatic cooker shown in FIGURE 1 and generally indicated by the numeral 10, comprises the usual inlet and outlet tempered hydrostatic legs 12 and 14 communicating with the central cooking chamber 16. A pair of laterally spaced endless sprocket chains 18 (only one being shown) are interconnected by transversely extending generally I-shaped carrier bars 20 spaced a sufficient distance apart to define compartments in which the containers are located. The containers are located between the carrier bars 20 at a feeding station F and are released after the cooking has been completed at a discharge station D. The sprocket chains 18 follow the general path indicated by the broken line and travel in the direction of the arrows.

The containers first pass into the inlet hydrostatic leg 12 downwardly therethrough and upwardly into the cooking chamber 16. The chains continue through the cooking chamber passing downwardly through the water and up the outlet hydrostatic leg 14. When the chains 18 pass the discharge station D the containers are deposited on a discharge conveyor.

The body of the hydrostatic cooker is formed by a horizontal bottom plate 22 to which is joined upwardly extending side plates 24 and 26 forming the outer walls of the hydrostatic legs. Walls 28 and 30 parallel to and spaced inwardly from the plates 24 and 26 form the inner walls of the hydrostatic legs. The cooking chamber 16 is defined by upwardly extending walls 32 and 34 which are interconnected at their upper ends by a curved plate 36. The lower ends of the walls 32 and 34 are joined to the walls 28 and 30, respectively, by short lateral plates 38. Transverse walls 39 (only one being shown) are connected to the above mentioned spaced plates and walls to form the body of the cooker.

The sprocket chains 18 are driven in the illustrated path by a sprocket 40 secured to a shaft 42 which also carries a small sprocket 44 connected, by means of a sprocket chain 46, to a sprocket 48 driven by a suitable motor 50. Idler sprockets 52, located in the cooking chamber, and 54, mounted on shafts 56 and 58, respectively, support and guide the chain through the cooking chamber and through the outlet hydrostatic leg 14. As the sprocket chains 18 traverse the feeding and discharge station they pass around a smaller sprocket 60 which produces a sharp bend or curve in the chains. As the carrier bars pass around this sharp curve adjacent ones assume an angular orientation allowing the containers C which have been processed to be discharged by gravity onto a discharge conveyor 62. At the feeding station a feed conveyor 64 and a pusher element 66 locate the containers between the angularly related carrier bars 20 for passage through the cooker.

As the glass containers enter the inlet hydrostatic leg 12 they encounter water having a temperature of approximately 210° F. The temperature of the water increases at the bottom of this leg to approximately 220° F. and further increases in temperature to a maximum of 250° F. immediately before the containers enter the cooking chamber 16. Such gradual heating of the jars obviously raises the temperature of its contents causing the resulting non-condensible gases to be liberated and expanded raising the internal pressure of the containers. The force of the internal pressure is sufficient to cause the lid to become loose thereby destroying the seal and accordingly rendering the contents unsuitable for consumption.

In accordance with one basic purpose of this invention the cooking chamber 16 is supplied with air, or other suitable gaseous fluid, under sufficient pressure to completely or partially balance the internal pressure of the glass containers and thereby maintain the lid in its sealing relationship. Referring to the drawing there is shown a conduit 68 which is connected to any suitable source of pressurized air and is arranged to supply air under pressure to the cooking chamber 16. A valve 70 and a pressure responsive actuator 72, connected to a pressure detecting device 74, are provided for maintaining the pressure of the air in the cooking chamber 16 at any desired value. For wide mouth glass jars, whether they be of the vacuum seal or the twist-off type, it has been found that a pressure of 30 p.s.i.g. is sufficient to override the internal pressure of the jars.

The actual cooking is performed by streams of water which are arranged in cascade fashion and directed to the jars located between the carrier bars 20. These cascading streams also serve the purpose of mixing the atmosphere in the cooking chamber 16 to thereby prevent the occurrence of temperature gradients. As shown in the drawing there is located below the level of the water in the cooking chamber 16 a conduit 76 connected to the inlet of a pump 78. The discharge of the pump is connected to a generally U-shaped manifold conduit 80 which is arranged to supply hot water at the cooking temperature of 250° F. to a plurality of branch conduits 82. Each of these conduits terminate adjacent the interior surface of the walls 32 and 34. The conduits 82 supply water to U-shaped troughs 84 which are located laterally adjacent the upcoming and downcoming straight runs of the conveyor chains 18. The troughs are provided with openings that define streams of water S directed inwardly and downwardly toward the containers located between the carrier bars 20. It is these streams of water which perform the cooking or maintain a uniform atmosphere.

A constant temperature is maintained in the cooking chamber 16 by supplying saturated steam at 80-125 p.s.i.g. having respective corresponding temperatures of 324 and 353 degrees Fahrenheit. This is the range of temperatures that steam is usually available in canneries. Steam is introduced into the cooker by a conduit 86 connected to the source of steam and to which is also connected a branch conduit 88. The conduit 88 is connected to a valve 90 having another conduit 92 connected thereto which opens into the cooking chamber 16. The rate at which steam is supplied to the cooking chamber 16 is determined by a suitable temperature sensitive device 94 which conditions a valve actuator 96 to open and close the valve 90 and thereby regulate the amount of steam which is applied to the cooking chamber 16. It is the primary purpose of the steam to maintain the cascading streams of water at the cooking temperature of 250° F.

Steam from the conduit 86 also passes through another conduit 98 having a valve 100 operated by an actuator 102 connected to another similar temperature sensing device 104. A distributor bar 106, including a plurality of nozzles 108, supplies steam just below the level of the water in the cooking chamber 16. This steam heats the water located between the walls 32 and 34 to the cooking temperature, and, as shown, the inlet conduit 76 draws water from this region for distribution to the various troughs 84.

The saturated steam at the above indicated temperatures and pressures is supplied to the cooking chamber 16 by the conduit 92. Although it would appear that the pressure of the cooking chamber might be substantially greater than 30 p.s.i.g. due to the introduction of steam ranging in pressure between 80 and 125 p.s.i.g. it is to be recognized that the majority of the heat of vaporization is almost immediately transferred to the cascading water, the air, and to the walls of the chamber 16 resulting in a rapid decrease in steam pressure. What results is saturated liquid at substantially 250° F. which collects at the bottom of the chamber 16. Accordingly, the pressure in the chamber 16 is mainly established by the air supplied through the conduit 68.

The over-all operation of the novel hydrostatic cooker is as follows: Containers are fed in lateral adjacency to the feeding station F by the conveyor 64. At the feeding station the carrier bars 20 assume an angular orientation due to the sharp curve assumed when the conveyor chains 18 pass about the sprocket 60. As is customary several jars lying in end-to-end relationship are urged by pusher element 66, operating in timed relation with the conveyor, between the bars 20 which are adjacent the conveyor 64. The jars are transported upwardly around the sprocket 40 and downwardly into the inlet hydrostatic leg 12 where the upper portion of the water is at a temperature of 210° F. The jars progress downwardly into the leg 12 wherein the water temperature gradually rises to 220° F. at the bottom of the leg. This of course, causes the jar and its contents to be gradually heated thereby avoiding rupture of the jars due to thermal stresses.

The jars then enter the body of water, located between the walls 32 and 34, whose temperature in the vicinity of its surface is at 250° F. (the cooking temperature) and then enter the cooking chamber 16 having an air atmosphere at a pressure of 30 p.s.i.g. and a temperature of 250° F. Cooking water withdrawn by the pump 78 and distributed by the manifold 80 and the conduits 82, fills the various troughs 84 whereupon it cascades downwardly and inwardly flooding the jars. The heat transferred to the jars and to the other heat absorbing elements such as the walls and the jar conveyor, by the cascading water is replaced by the steam derived from the conduit 92.

When the jars re-enter the body of water below the cooking chamber 16 the cooking step is completed. The jars then progress into the outlet hydrostatic leg 14 which contains water of gradually decreasing temperature with the water near the surface having a temperature of 210° F. Further cooling may be provided after the jars complete their passage through the leg 14 to reduce the temperature to about 100° F. Upon arrival at the discharge station D the jars are deposited on the conveyor 62.

Although fixed values of temperature and pressure have been specified it is to be understood that they are merely nominal values. The values may vary either way and they may be intentionally lowered or raised depending upon the pressure difference the container is capable of withstanding, the products desired to be cooked, and the liquid other than water which is used to perform the cooking.

Thus according to the above description of the invention it is evident that a conventional hydrostatic cooker can be adapted to process food contained in wide mouth glass jars. The provision of the air override maintained at the desired pressure effectively precludes destruction of the seal. Cascading cooking water floods the jars for a sufficient period of time to perform the cooking. A constant temperature of the cooking water is maintained by providing the introduction of steam in the cooking chamber and such cascade of water also assists in the prevention of temperature gradients in the chambers.

Although the invention as described above and illustrated in FIGURE 1 contemplates directing the cascading water directly against the containers, it has been discovered that sprays or cascades of water directed adjacent to, but not against, the containers also provides a very effective heating medium when used in a steam-air environment in the cooking chamber 16 of the second embodiment of the invention illustrated in FIGURE 2.

Since the apparatus of the second embodiment of the invention includes parts which are identical to those of the first embodiment of the invention these parts will be assigned the same numerals to indicate their identity and will not again be described in detail.

In regard to steam-air mixtures, the use of a steam-air mixture in the cooking chamber without providing means for aggressively circulating the mixture has been found to be unsatisfactory as a heating medium, When a steam-air mixture alone is used, the containers and carriers which are cooler than the mixture causes the steam or vapor within the mixture to be drawn toward the containers causing the steam to condense upon contact with the cooler containers and carriers thereby leaving a zone of air around the containers and carriers. This zone of film of air acts as an insulator and thus retards the transfer of heat from the steam-air mixture to the containers.

When water at the desired sterilizing temperature is cascaded or sprayed downwardly immediately adjacent to, but not against, the two vertical runs of the conveyor 18 that pass through the cooking chamber 16, it has been discovered that the objectionable air zone around the containers is minimized. Since the area immediately adjacent the carriers and containers is high in vapor by virtue of the cascading water moving therethrough, in accordance with the present invention the vapor which condenses on the containers to form a liquid condensate Y (Fig. 3) is immediately replaced by vapor Z which evaporates from the hot cascading water S' and S" thus preventing the formation of an air zone around the containers. The downward movement of the water adjacent the carriers also assures that the steam-air mixture in the cooking chamber is adequately mixed or circulated thereby assuring an even application of the vapor in the steam-air mixture to all exposed surfaces of the containers being processed.

In order to modify the apparatus 10 so that the cascading water is not directed against the containers C and carriers 20 but is directed adjacent thereto, the location of the openings in the troughs 84' are situated so that the water is directed downwardly rather than toward the containers. Thus, the streams of water S' (FIGS. 2 and 3) move downwardly as a water curtain along one side of each vertical run of the conveyor disposed within the cooking chamber 16. In addition, troughs 84" are preferably provided adjacent the other sides of the vertical runs and have openings directed downwardly to discharge a curtain of hot water adjacent the vertical runs. The troughs 84" are supported from each other and by the walls 39 of the cooking chamber 16 and are supplied with hot water from the pump 78 through a conduit system 80'.

Thus, in accordance with the modified form of the invention the containers are heated by the hot steam-air mixture in the cooking chamber and not by hot water that is directed against the containers as in the first embodiment of the invention. In this form of the invention the water merely cascades downwardly past one or both sides of the vertical runs of the conveyor 18 thereby circulating the steam-air mixture and assuring that this mixture is maintained at a high moisture content adjacent the carriers and containers, and accordingly, prevents the formation of an air zone around the containers. It will be recognized that a portion of the hot cascading water will vaporize as indicated by arrows Z in FIGURE 3, and that this vapor will condense on the can and fall to the bottom of the cooking chamber for reheating and subsequent return to the troughs by means of the pump 78 and associated conduit systems.

Although the best mode contemplated for carrying out the present invention has been herein shown and described it will be apparent that modification and variation may be made without departing from what is regarded to be the subject matter of the invention as set forth in the appended claims.

Having completed a detailed description of the invention so that those skilled in the art could practice the same, I claim:

1. A continuous process for cooking food contained in hermetically sealed wide mouth glass jars comprising the steps of cooking the food contents by passing the jars immediately adjacent to but spaced from streams of cascading water at the cooking temperature, subjecting the external surface of the jars to a pressurized gaseous fluid during said cooking, such gaseous fluid being maintained at a pressure which is sufficient to completely or partially balance the internal pressure of the jars and the portion of said gaseous fluid immediately adjacent the containers being maintained at the cooking temperature and at a high vapor content by passage of the streams of water therethrough, preliminarily gradually heating the jars prior to their being subjected to the gaseous fluid, and finally gradually cooling the jars after their food contents have been cooked.

2. A continuous process for cooking food products hermetically sealed in glass containers comprising the steps of cooking the food contents of the containers by passing the containers through a mixture of steam and air, maintaining the steam-air mixture at a total pressure that acts against the external surfaces of the containers with sufficient force to prevent rupture of the hermetically sealed containers, discharging streams of water immediately adjacent to but spaced from the containers and at a temperature no lower than the cooking temperature for heating the steam-air mixture adjacent the containers to cooking temperature and for causing the steam-air mixture to circulate assuring that the mixture immediately adjacent the containers has a high vapor content at the cooking temperature, preliminarily gradually heating the containers prior to their being subjected to the steam-air mixture, and finally gradually cooling the containers after their food contents have been cooked.

3. The process of claim 2 wherein stirring of the hot steam-air mixture is effected by the streams of cascading water and wherein the steam-air mixture is the only heating medium which contacts the containers as they are being passed through the steam-air atmospehere.

4. The process of claim 3 wherein the containers are moved along vertical paths when passing through the steam-air mixture and wherein vertical streams of cascading water are directed downwardly on both sides of each path immediately adjacent to each path.

5. A continuous process for cooking food products hermetically sealed in glass containers comprising the steps of preliminarily gradually heating the sealed glass containers, cooking the food contents of the containers by passing the containers through a mixture of steam and air, maintaining the total external container balancing pressure by controlling the air input into the mixture of steam and air, and maintaining the temperature of the steam-air mixture at the required cooking temperature by discharging water at least equal to the required cooking temperature through the steam-air mixture immediately adjacent to the containers and in a direction which will preclude direct contact of the water with the containers when the water is in the liquid state.

References Cited
UNITED STATES PATENTS

| | | | |
|---|---|---|---|
| 806,354 | 12/1905 | Loew | 99—362 |
| 902,826 | 11/1908 | Loew | 99—362 |
| 1,955,289 | 4/1934 | Greenfield | 99—1 |
| 2,262,030 | 11/1941 | Meyer | 99—362 |
| 2,282,187 | 5/1942 | Herold et al. | 99—362X |
| 3,252,405 | 5/1966 | Mencacci | 99—214X |

FOREIGN PATENTS 1,086,004  10/1967  Great Britain.

HYMAN LORD, Primary Examiner

U.S. Cl. X.R.

99—182, 214, 362